United States Patent [19]

Kowalski

[11] 4,393,588

[45] Jul. 19, 1983

[54] FOOD MINCER

[75] Inventor: Eugene Kowalski, South Orange, N.J.

[73] Assignee: Elpo Industries, Inc., Paramus, N.J.

[21] Appl. No.: 241,662

[22] Filed: Mar. 9, 1981

[51] Int. Cl.[3] .......... A47J 19/04

[52] U.S. Cl. .......... 30/196; 241/168

[58] Field of Search .......... 30/131, 132, 197, 226, 30/227, 114, 195, 196, 254; 241/168, 169, 169.2

[56] References Cited

U.S. PATENT DOCUMENTS

| | | | |
|---|---|---|---|
| 550,483 | 11/1895 | Carrier | 30/196 X |
| 2,260,884 | 10/1941 | Clinton | 30/254 |
| 3,046,655 | 7/1962 | Sproson | 30/254 X |
| 4,229,881 | 10/1980 | Troxel | 30/254 |

*Primary Examiner*—Jimmy C. Peters

*Attorney, Agent, or Firm*—Weingram & Klauber

[57] ABSTRACT

An implement for mincing, for example, garlic having a pair of members pivotable about a common axis. Each member has a handle portion with a protruding inner end portion adapted to abut against each other when the members are brought together, and another portion on the other side of the pivot provided with a plurality of blade-like members which interleave with a similar set of blade-like members on the other pivotable member for grasping, and shearing through a work-piece such as a clove of garlic. The ends of the members with the blade-like portions are notched at their ends remote from the pivot for aiding the grasping and holding of the work-piece between the blade-like members. Each of the pivotable members is constructed to be completely interchangeable with the other.

6 Claims, 7 Drawing Figures

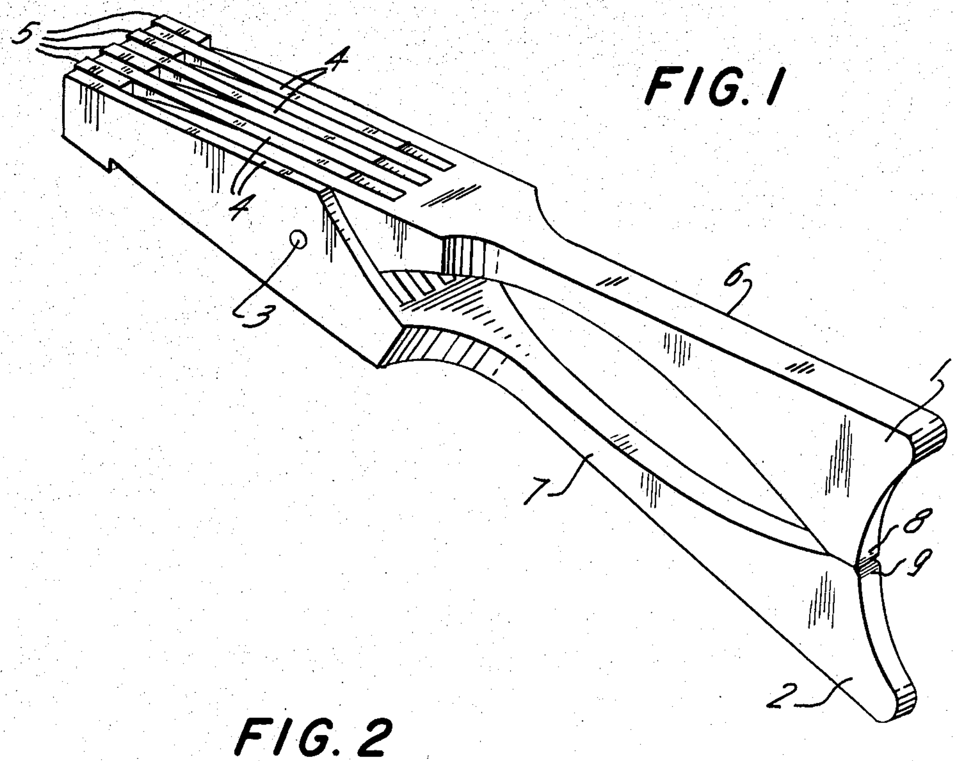
FIG. 1
FIG. 2
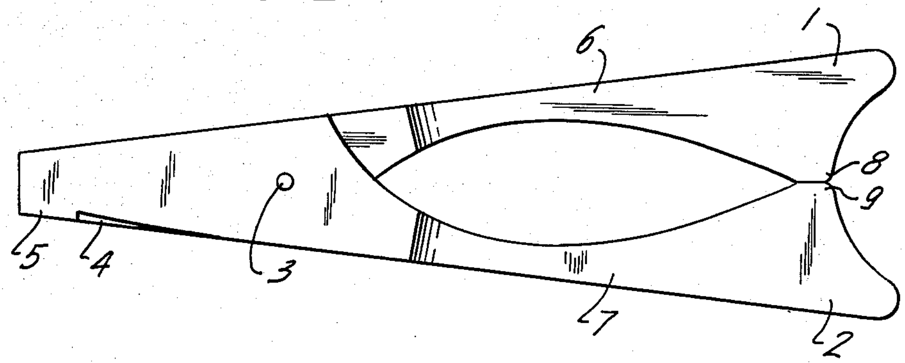
FIG. 3
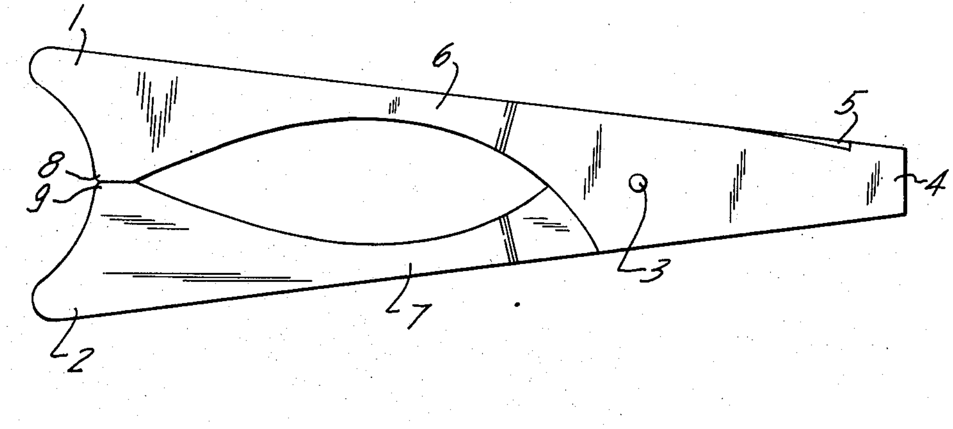

FOOD MINCER

FIELD OF THE INVENTION

This invention relates to a mincing implement such as an implement for mincing garlic cloves, and the like. While the invention will be described in connection with the mincing of garlic cloves, it is to be understood that the invention is applicable to the mincing of other food-stuffs, and even articles which can be minced, but which may not be food-stuffs.

BACKGROUND OF THE INVENTION

The mincing implement according to the invention is basically a scissor-type instrument especially adapted to cut, or mince, by shearing action. While scissor-type instruments are generally known, instruments employing a plurality of interleaving blade-like elements are little known.

U.S. Pat. No. 2,709,298 issued to Mater, for example, shows a scissor-type implement for slicing having a top frame 16 with parallel-spaced, downwardly-spaced pusher fingers 30 that force items to be spliced through a parallel row of wires.

U.S. Pat. No. 1,345,882 issued to Repass shows a scissor-type instrument, namely a shears, having two shearing arms 11 actuated by one handle, which straddle and coact with a wide shearing blade 18 actuated by the thumb handle of the shears.

U.S. Pat. No. 4,007,523 issued to Bianco shows a B-X cable shears similar in construction to that shown in U.S. Pat. No. 1,345,882 with a singular actuating element 36, adapted to coact with two parellel fingers, connected to a common handle.

U.S. Pat. No. 540,092 issued to Farish shows a castrating forceps having a pair of jaw arms A and B held on a pivot C, and formed with handles A' and B' under control of the operator for moving the jaws relative to one another. Botton jaw D is formed on its upper face with projection D' having to serrations extending transversely and terminating at their ends in side flanges $D^3$. The inner face $D^4$ of the projection D' forms a cutting face for the transversely extending knife F secured to the inner face of jaw E.

Of interest also is U.S. Pat. No. 1,320,770 issued to Mayhew which shows a plier-type instrument adapted for use in opening and closing chain links in which the outer edge faces of the jaws are provided with longitudinally spaced notches, or recesses 5, in which the side members of the chain-link are adapted to be engaged.

U.S. Pat. No. 2,464,206 issued to Becker shows a multiple-bladed knife having a central holder 20, generally T-shaped in cross-section, and two outer clamping plates, or cutting blades, 21 and 22 located on opposite sides of the T-shaped holder 20, and pivoted thereto at 23.

U.S. Pat. No. 1,614,282 issued to Cleary shows a vegetable and fruit slicer having a cutting block A provided on its upper surface with a series of grooves, mounted on the cutting block is a knife-holder frame C supporting knives 2. To cut, the cutting frame is lifted from the block, thus raising the knives which are then lowered to cut the vegetable or fruit.

U.S. Pat. No. 1,903,257 issued to Dahl shows a shears or scissors for cutting hair having cutting edges which are serrated to form teeth which fit into each other.

U.S. Pat. No. 1,649,318 issued to Miller describes a pruning knife having a slotted block 2 at one end of a handle adapted to receive a knife 5.

U.S. Pat. No. 4,095,339 issued to Turner shows an eggslicer having an egg holder 14 and a cutting blade 46 pivoted on an arm and moveable laterally relative to the egg holder.

U.S. Pat. No. 47,250 issued to Carter shows a shears or scissors one edge of which is ground to a knife-edge, and other is plain or provided with saw-teeth.

U.S. Pat. No. 639,850 issued to Hahn shows a mutiple-blade slicer the blades of which fit into slots.

U.S. Pat. No. 1,230,766 issued to Ovens shows a clam fork of scissor-like construction having two similar members provided with blades 8 provided at the inner portions of their side edges with bevelled or cutting edges 9 so the members are brought together, the head of a clam is severed.

SUMMARY OF THE INVENTION

The mincing implement according to the invention is a scissor-type instrument having two arms connected together by a pin-like member about which the arms pivot. Each arm is provided, at one side of the pivot, with blade-like members which interleave with the blade-like members of the other arm when they are pivoted in a scissor-like movement. The end of the arms carrying the blade-like members are notched or hooked to receive and firmly hold the article to be minced, e.g. a garlic clove. The other end of each arm forms a handle which is curved inwardly to form a projection at the end thereof. These projections abut when the arms are moved together and serve to guide the movement of the arms in appling pressure to the article being minced between the blades.

Each of the arms is identical to the other, so that they are completely interchangeable. Moreover, the blade-like members, because they interleave, do not have to be ground to a sharp cutting edge, the cutting and mincing being the result of a shearing action on the article being minced.

Accordingly, it is a principal object of the invention to provide an implement for mincing material such as a garlic clove, by cutting and shearing action involving the movement of blade-like elements relative to one another in the material.

It is a further object of the invention to provide a mincing implement in which the article to be minced is firmly grasped and held while being minced.

It is still a further object of the invention to provide a scissor-like instrument for mincing materials in which an article is cut and sheared and pressure applied through the handles of the instrument.

Another object of this invention is to provide a scissor-like instrument for mincing materials using interchangeable parts.

A still further object of this invention is to provide a multiple-blade scissor-like instrument having interchangeable parts for cutting and mincing articles by shearing action.

Yet another object of this invention is to provide a scissor-like instrument for mincing materials that is relatively easy to manufacture.

A further object of this invention is to provide a scissor-like instrument for mincing materials that is relatively durable.

Still another object of this invention is to provide a scissor-like instrument for mincing materials that is relatively reliable in operation.

Another object of this invention is to provide a scissor-like instrument for mincing materials that can be manufactured relatively economically.

Yet another object of this invention is to provide a scissor-like instrument for mincing materials that uses a minimum of different parts.

Other objects and advantages will be apparent from the description of the illustrated embodiment of the invention, and the novel features will be particularly pointed out hereinafter in the claims.

BRIEF DESCRIPTION OF THE DRAWINGS

FIG. 1 is a perspective view of the mincing implement, according to the invention in the closed position;

FIGS. 2 and 3 are elevational views of opposite sides of the implement when closed;

DESCRIPTION OF THE PREFERRED EMBODIMENT

Figure 4:
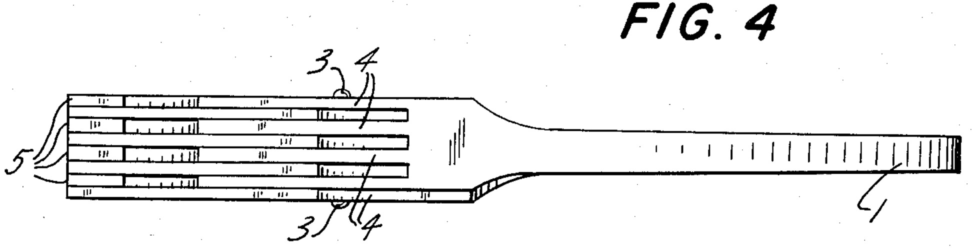
FIG. 4 is a plan view, of the instrument.
Figure 5:
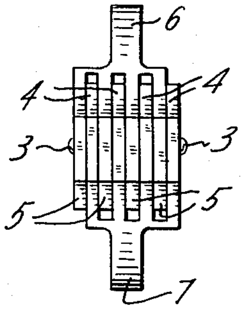
FIG. 5 is a front view of the mincing implement showing the blade-like members.
Figure 6:
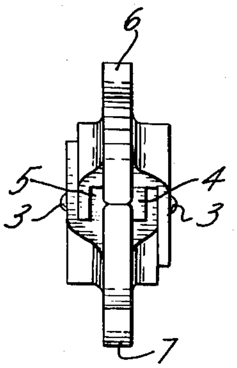
FIG. 6 is an end view of the mincing implement showing the handles, closed.
Figure 7:
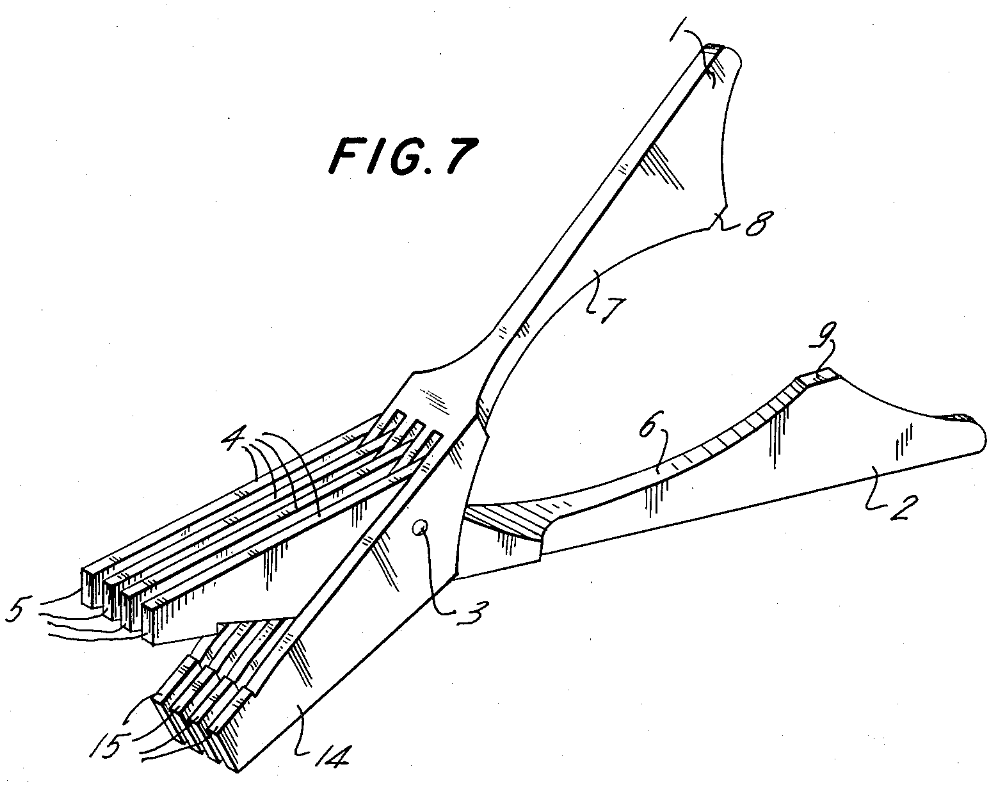
FIG. 7 is a perspective view of instrument, in the open position.

The mincing implement according to the invention is a scissor-like instrument having a pair of arms 1, 2 which pivot about a pin 3. One end of each arm 1, 2 is provided with several blade-like members 4 and 14 respectively, notched at the end remote from the pin 3 by projections 5 and 15 respectively, which serve to hold firmly an article placed between the blade-like members. The other end of each arm forms a handle 6, 7 respectively which curves gently inwardly to form projections 8, 9 which, when the handles are brought together, serve as stops for the handles to permit pressure to be applied to the handles and therefore to the article placed between the blade-like members.

Each of the arms is identical with the other and thus is interchangeable. Blades 4 and 14 respectively, of each arm, interleave, so as to cut the article placed between them and by shearing action, cut and mince the article. The blade-like members are shown with flat cutting edges since, in most cases, the article will be relatively soft so that the blades can easily penetrate and the article cut and minced by shearing action. However, if desired, these edges may be provided with a knife-like cutting edge to facilitate penetration.

An article such as a garlic clove, placed between blade-members 4 and 14 respectively, is securely held by the notches formed by projections 5 and 15 respectively, and cut and minced by 4 and 14 respectively, when handles 6 and 7 are moved together.

Although this invention has been described in connection with mincing of garlic cloves, it is apparent that it can be used for mincing a wide variety of food-stuffs, as well as staple items.

It will be understood that the various changes in the details, materials, arrangements of parts and operating conditions which have been described and illustrated in order to explain the nature of the invention, may be made by those skilled in the art within the principles and scope of the invention.

Having thus set forth the nature of the invention, what is claimed herein is:

1. An implement for mincing comprising:

a pair of pivoted members each having a handle portion and a portion having a plurality of blade-like members with nonreentrant cutting edges;

the pivoted members being interchangeable;

the blade-like members on one pivoted member being adapted to interleave with a complementary set of blade-like members on a like portion of the other pivoted member;

each of the portions having the blade-like members being notched at their ends remote from the pivot for securely grasping and holding an article between the blade-like members to enable the blade-like members to shear through an article as the blade-like members are pivoted.

2. An implement for mincing as claimed in claim 1 in which each handle portion has a protuberance extending inwardly which is adapted to abut a like protuberance on the other handle to guide relative movement of the handles whereby pressure is applied to the handles.

3. An implement for mincing as claims 1 or 2 wherein the pivoted members are pivoted about a central pin and form a scissors.

4. An implement for mincing as claimed in claims 1 or 2 in which the blade-like members each have a projection at the end thereof remote from the pivot which forms a notch in the blade-like members.

5. An implement for mincing as claimed in claims 1 or 2 in which each of said blade-like members has flat surfaces including:

a flat engaging surface and two opposing flat sides;

each intersection of said flat engaging surface and an opposing flat side forming a shearing edge;

the flat surfaces on the blades and complimentary blades facing each other to engage the article;

said opposing blade-like members coacting to first compress the article by means of coaction of the opposing flat engaging surfaces of the opposing blade-like members and then shear through the article as the blade-like members are pivoted to bring the adjacent opposite shearing edges into shearing proximity with each other.

6. An implement for mincing comprising:

a pair of pivoted members each having a handle portion and a portion having a plurality of blade-like members with nonreentrant cutting edges;

each handle portion having a protuberance extending inwardly which is adapted to abut a like protuberance on the other handle to guide relative movement of the handles when pressure is applied to the handles;

the pivoted members are pivoted about a central pin and for a scissors;

the blade-like members each have a projection at the end thereof remote from the pivot which forms a notch in the blade-like members;

the pivoted members are interchangeable;

the blade-like members on one pivoted member are adapted to interleave with a complementary set of blade-like members on a like portion of the other pivoted member;

each of said blade-like members having flat surfaces including a flat engaging surface and two flat sides and further including two cutting edges, one formed at each intersection of the flat engaging surface and a flat side, the flat engaging surfaces on the blades and complimentary blades facing each other to engage the article;

each of the portions having the blade-like members being notched at their ends remote from the pivot for securely grasping and holding an article between the blade-like members to enable the blade-like members to first compress an article by means of coacting with the opposing flat cutting surfaces of the opposing blade-like member and then shear through an article when the blade-like members are pivoted to bring the adjacent opposing cutting edges into shearing proximity with each other.

* * * * *